July 7, 1964 W. A. REIMER 3,139,668

PACKAGE METHOD FOR PRODUCING A MEMORY SYSTEM

Filed May 14, 1962 5 Sheets-Sheet 1

INVENTOR.
William A. Reimer

BY

C. A. Gullbrandsen

Atty.

July 7, 1964 W. A. REIMER 3,139,668
PACKAGE METHOD FOR PRODUCING A MEMORY SYSTEM
Filed May 14, 1962
5 Sheets-Sheet 2

INVENTOR.
William A. Reimer
BY
C. Q. Gullbrandsen
Atty.

INVENTOR
William A. Reimer
BY C. A. Gullbrandsen
Atty.

INVENTOR.
William A. Reimer
BY
C. A. Sullivan
Atty.

July 7, 1964 W. A. REIMER 3,139,668

PACKAGE METHOD FOR PRODUCING A MEMORY SYSTEM

Filed May 14, 1962

5 Sheets-Sheet 5

INVENTOR.
William A. Reimer

BY C. A. McIlhondren

Atty.

United States Patent Office 3,139,668

Patented July 7, 1964

3,139,668
PACKAGE METHOD FOR PRODUCING A MEMORY SYSTEM

William A. Reimer, Villa Park, Ill., assignor to Automatic Electric Laboratories, Inc., Northlake, Ill., a corporation of Delaware Filed May 14, 1962, Ser. No. 194,246
6 Claims. (Cl. 29—155.5)

This invention relates to magnetic memory systems and more particularly to twistor memory systems.

Prior memory systems in this class usually are either of the permanently coded type or of the destructive read out type which require complex control circuits for entering and retrieving information. In the former memory systems coded information once stored in the system is not easily changed thus making the system less flexible than is desirable. In the latter, destructive read out, memory systems separate control circuits are usually required for both entering and retrieving information. The retrieval process usually destroys the stored information making it necessary to temporarily store the retrieved information and then re-enter it into the memory.

An advantage of the permanent twistor memory system is simplicity of control circuitry while an advantage of the destructive read out system is flexibility and ease of coding.

Accordingly, it is an object of this invention to provide a semi-permanent twistor memory system that is easily mechanically alterable which requires only simple control circuits.

A feature of this invention is a packaging method using interlocked planes to accurately locate the memory elements relative to one another.

In accordance with the principles of this invention, a length of "twistor" material which may be of the type described in the November, 1957 issue of The Bell System Technical by A. H. Bobeck, volume XXXVI, pages 1319–1340 is located between a current carrying solenoid and a copper conducting sheet called a "virtual solenoid." The virtual solenoid is not directly electrically connected to either the solenoid or to the length of twistor wire. According to the principle of the virtual solenoid a conducting material flux linked to a current carrying conductor, solenoid in this case, may aid in strengthening the magnetic field on the twistor between the two elements. This added field strength is the result of eddy currents induced by time varying flux linkages between the current carrying conductor and the conducting sheet. Further, according to the principles of this invention, the strength of this added magnetic field may be reduced by punching out an opening in the conducting material immediately above the current carrying conductor.

A length twistor is placed in the magnetic field between the conducting sheet and the solenoid. A sufficient solenoid current will then set up a magnetic field strong enough to change the magnetic state of the twistor while the same current will not cause a change of state if an opening is made in the conducting sheet above the twistor segment. The virtual solenoid is designed into the twistor memory array and coding is accomplished by making openings in the conducting sheet at specified locations.

In this memory system the solenoids used are made by printed wiring techniques. These solenoids are formed of a plurality of turns which do not necessarily form a loop around the twistor but do set up a sufficient field in conjunction with the virtual solenoid to change the magnetic state of the twistor. By using many turns less drive current is required to produce the same field.

The memory system in accordance with this invention is packaged in connected planes called stacks which are then located one upon the other with the aid of interlocking pins to form a memory stack of desired capacity.

This invention will be better understood and further objects and features will become apparent upon reading the following description in which.

In this twist or memory system a solenoid is placed at right angles to a length of twistor wire. The segment of the twistor crossing the solenoid is a bit location or address. The width of the solenoid determines length of twistor coinciding with it and the length of the bit location.

Figure 1:
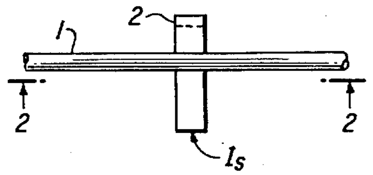
FIG. 1 is a diagrammatic illustration in schematic form of a twistor and a solenoid.
Figure 2:
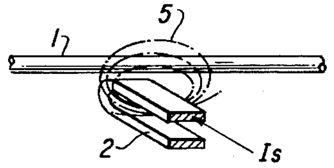
FIG. 2 is a sectional view taken generally along the line 2—2 of FIG. 1 showing the flux-linked twistor and solenoid.

FIGURES 1 and 2 give two views of a twistor, 1, placed perpendicular to a solenoid, 2. The solenoid current $I_s$, sets up a field, 5, linking that segment of the twistor adjacent to the solenoid. It is a property of a twistor that when a strong field is applied to any segment of it that segment can switch from a first magnetic state to a second magnetic state. This change is characterized by a pulse occurring when the magnetic state changes. This pulse may be monitored to determine the condition of the bit location at any time.

Figure 3:
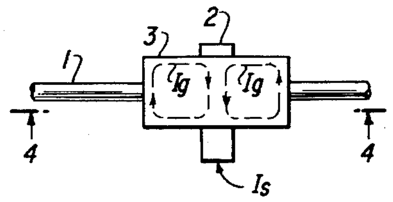
FIG. 3 is a diagrammatic illustration in schematic form of a twistor, a solenoid and a conducting sheet.
Figure 4:
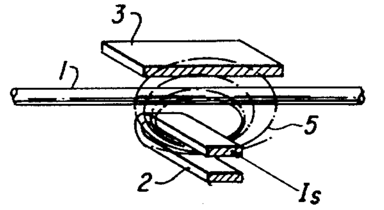
FIG. 4 is a sectional view taken generally along line 4—4 of FIG. 3.

FIGURES 3 and 4 show the arrangement of FIGURE 1 with the single addition of a sheet of conducting material 3 (usually copper), placed such that the twistor lies between the solenoid, 2, and the sheet of conducting material, 3.

The conducting material is not electrically connected to the other elements but is linked by the field, 5, produced by solenoid 2. This conducting sheet, named a virtual solenoid, is, when flux linked to the solenoid, an embodiment of the physical law concerning the generation of induced currents by time changing magnetic flux linkages. The production of such currents, generally called "eddy currents" is described in 20.55 Principles of Electric and Magnetic Circuits, Boast, Harper Bros. 1950 and in other elementary works on magnetics. When the current $I_s$ flows in the solenoid, 2, a current $I_g$, is induced in conducting sheet, 3.

This induced current, $I_g$, flows opposite to current, $I_s$, and is most dense in that part of the conducting sheet directly above the solenoid, 2. Current $I_g$ produces a field which adds to the solenoid field and assists in switching the twistor from a first magnetic state to a second magnetic state. Thus by using the virtual solenoid as described above the magnetic state of the twistor may be switched with a lower magnitude of solenoid current $I_s$.

Figure 5:
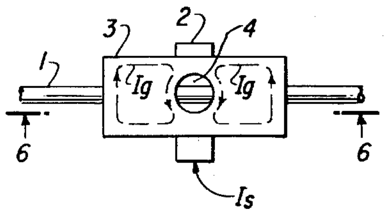
FIG. 5 is a diagrammatic illustration in schematic form of a twistor, a solenoid and a conducting sheet.
Figure 6:
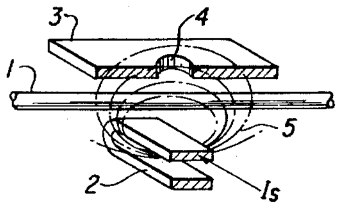
FIG. 6 is a sectional view taken generally along the line 6—6 of FIG. 5.

FIGURES 5 and 6 show the same arrangement shown in FIGURES 3 and 4 with the exception that an opening 4, has been punched in the conducting sheet immediately above the bit location. Placing an opening in the conducting sheet causes the induced current $I_g$ to follow a different path which assures that the field existing at the bit location will be weaker than that which existed before the opening was made in conducting sheet. Thus, it is seen that current $I_s$ must be greater after an opening is made in the conducting sheet in order to produce the same field on the twistor as that needed before the opening existed.

Figure 7:
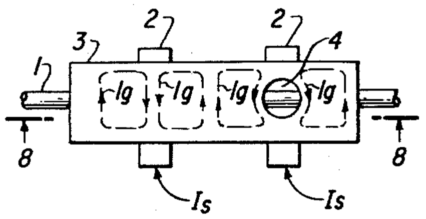
FIG. 7 is a diagrammatic illustration in schematic form of twistors, solenoids, and a conducting sheet.
Figure 8:
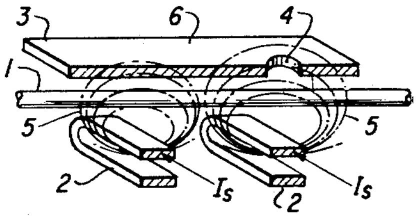
FIG. 8 is a sectional view taken generally along line 8—8 of FIG. 7.

FIGURES 7 and 8 show an embodiment of the virtual solenoid as it is used in a semi-permanent twistor memory system. In this arrangement a conducting sheet 6 extends over first and second solenoids 2. Twistor 1 lies between the conducting sheet and the solenoids. The conducting sheet is punched out above the second solenoid. Under these conditions the solenoid current magnitude and rise time and the opening dimensions may be chosen such that the field generated under the opening at the second solenoid will be insufficient to switch the twistor at that point, while the field under the intact portion at the first solenoid will cause the twistor at that point to switch. Consequently, semi-permanent coding of a twistor memory can be accomplished by making openings in the conducting sheet at specified locations.

The solenoids mentioned above may be of conventional wire wound type but the multi-turn printed wire solenoid as described below is preferable. This type of solenoid may be produced by standard printed wiring techniques. One type of multi-turn-printed wire solenoid is shown in FIGURE 9, another is shown in FIGURE 10.

Figure 9:
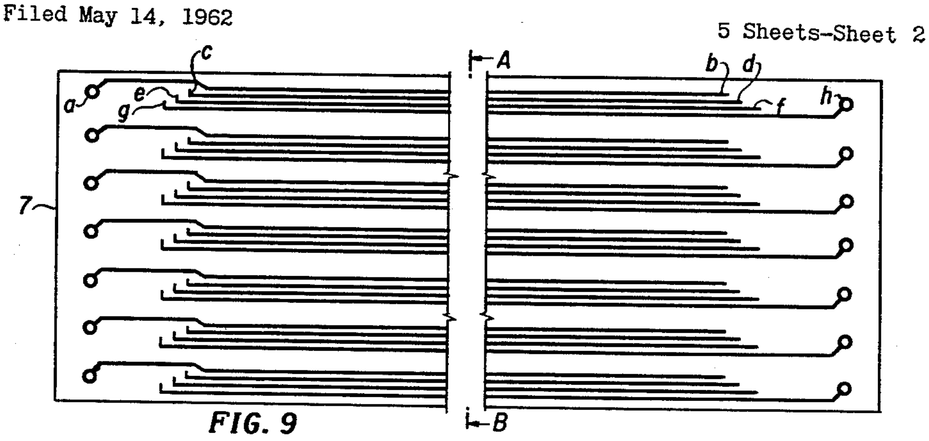
FIGS. 9 and 10 are schematic views of multiturn printed solenoids.

The solenoid of FIGURE 9 essentially consists of several narrow spaced printed conductors, *ab, cd, ef,* and *gh,* on a thin plastic strip 7. The solenoid is formed by folding the strip along the perpendicular bi-section AB of the conductors and soldering or welding one end of a conductor to the opposite end of the adjacent conductor. Thus, in FIGURE 9 a continuous electrical path with all conductors in series is formed from *"a"* to *"h"* by connecting point *"b"* to *"c,"* point *"d"* to *"e"* and point *"f"* to *"g."* In this way, a four turn solenoid is formed which requires approximately one fourth the solenoid drive current of a single turn unit to produce the same flux density.

Figure 10:
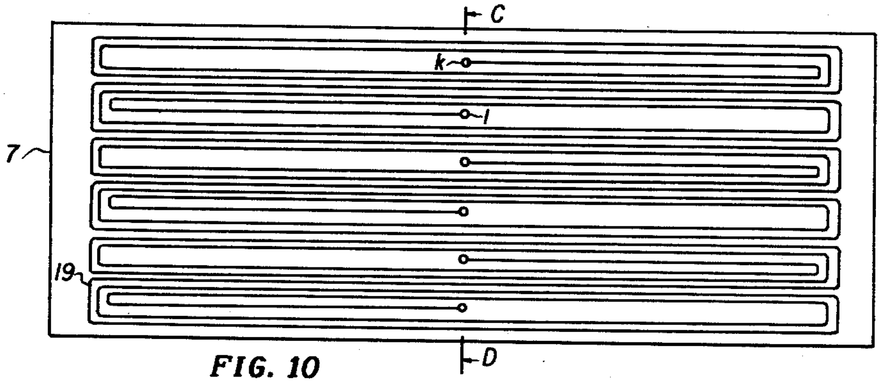
Figure 11:
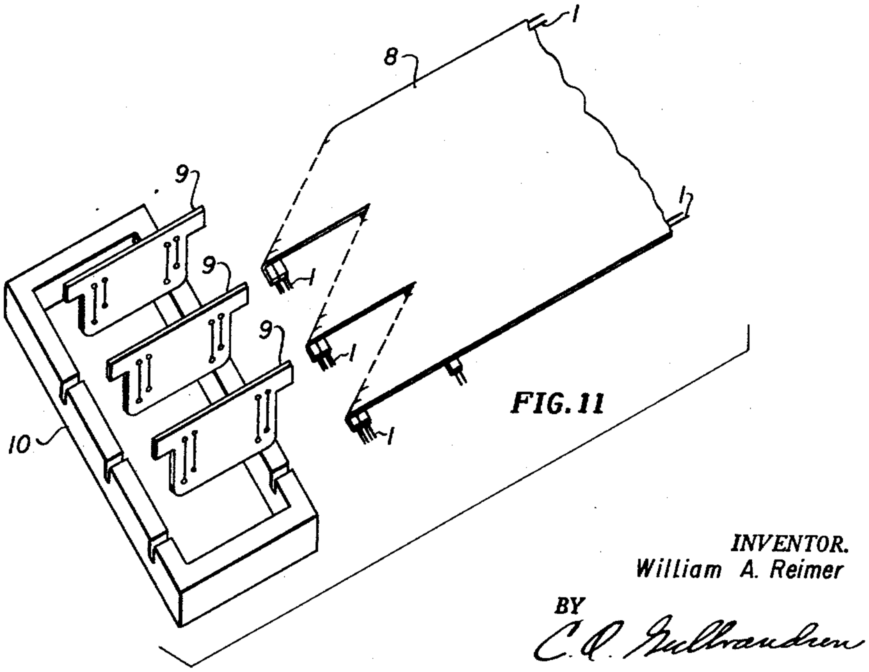
FIGS. 11 to 19 are schematic illustrations of a memory stack in various stages of construction.

The printed wire solenoid of FIGURE 10 eliminates the need for connecting conductors to form a multi-turn solenoid. Referring to FIGURE 10, one solenoid consists of five conductors in series between the solder pads *"k"* and *"l"* and two conductors on the outside of each pad. The five conductors between the pads constitute the solenoid proper while the conductors on the outside of the pads serve as current return paths. In operation with a twistor, the solenoid is laid at right angles to the twistor and folded along the bi-sector CD of the conductors. Solenoids having this configuration have been operated successfully in the semi-permanent twistor memory described herein.

A preferred embodiment of the semi-permanent twistor memory package and its method of assembly is shown in FIGURES 11 through 19. This package comprises a twistor tape termination (FIG. 11) including tape encapsulated twistor wires, 8, twistor termination board, 9, potting dam, 10, and encapsulant, 11, solenoid plane FIG. 12 including solenoid backing plates, 12, multi-turn printed wiring solenoids, 13, solenoid plane connector, 14, with conducting pins 15 which are later connected to the solenoids to provide access for the driving currents, spacer bars, 16, interlock pins, 17, holes to accept interlock pins, 18, major twistor service loop 19 and minor twistor service loop, 20, a solenoid plane code card, FIG. 14, including spacing plate, 21, copper coding sheet, 22, and holding pins, 23, to hold and locate the coding sheet a half word code card, FIG. 15 including spacing plate, 21, copper sheet, 24, and copper coding inserts, 25, in FIG. 18 side supports 26 and spacers 30 and in FIG. 19 circuitry for access to the memory including printed boards 27 and ferrite cores 28 with mounting brackets 29.

Figure 12:
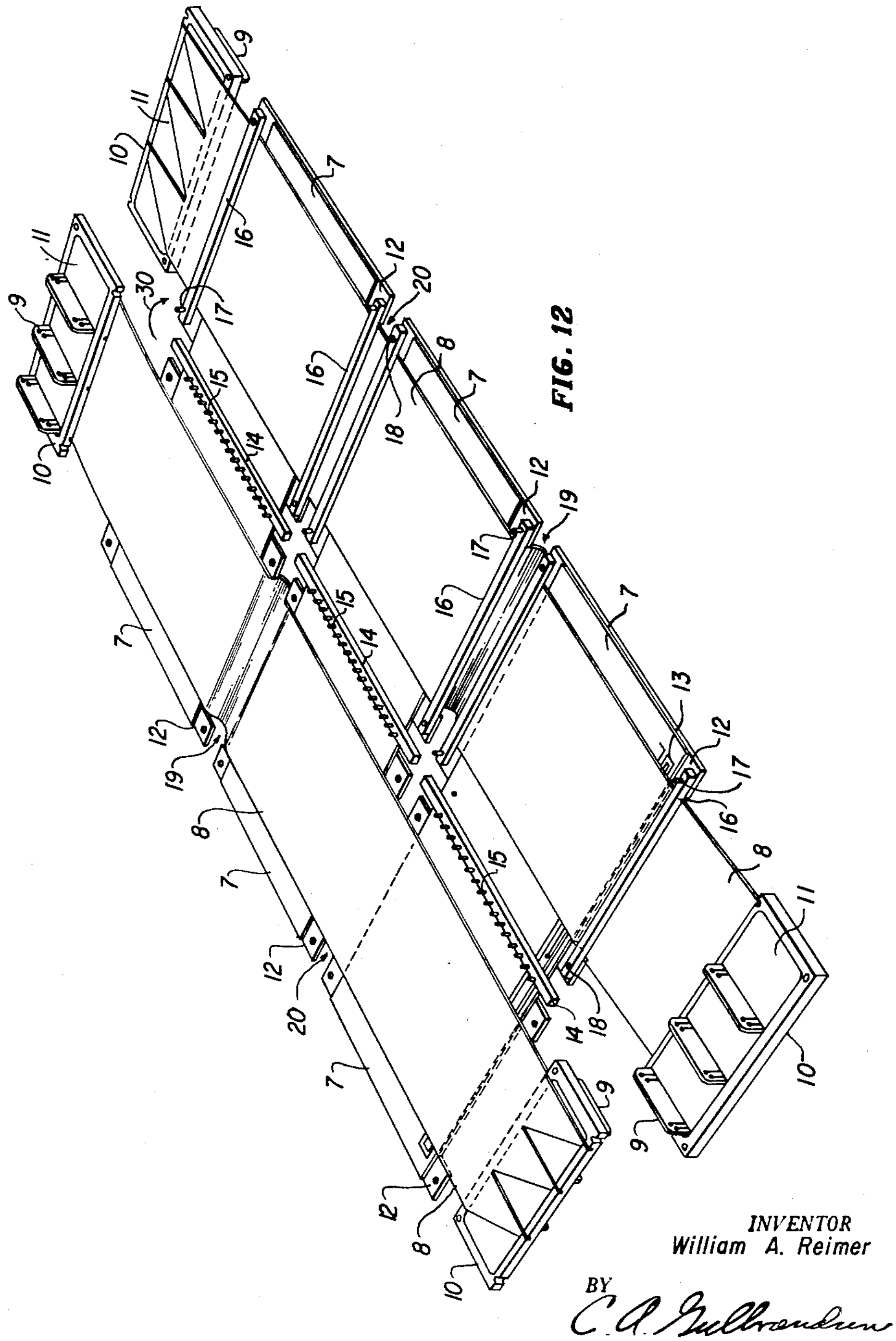

The first stage of memory construction is fabrication of the twistor tape termination shown in FIG. 12.

The length of tape-encapsulated twistor 8 needed in a memory of given capacity is calculated according to bit length and spacing required between bits and between stacks. The tapes are cut to length and each tape is terminated at each end in a printed wiring connector, 9. The connectors are mounted in a potting dam, 10 and all fine wires and their terminations encapsulated. The external connections to the twistor pairs are printed on the connector 9 and are in the area above the encapsulant 11 shown in FIG. 12. In the final assembly, the dams 10 are affixed to the memory.

Construction proceeds as shown in FIG. 12. The multi-turn printed wiring solenoids 13 in the memory are glued to two solenoid backing plates 12. Since more than one solenoid is printed on a sheet, the group of solenoids printed on a single flexible sheet forms a solenoid plane. The backing plates 12 provide a rigid support for the flexible solenoid plane as well as accurate location of words in the memory. The distance between the two solenoid backing plates determines the solenoid plane service loop 30. The solenoid plane connection is made in this service loop area, leaving one end of the memory 31 open for code-card insertion. The solenoid plane connector 14 not only provides electrical connection to the solenoids, but acts as a spacer that separates the solenoid halves by a predetermined distance. In the case of full solenoid plane coding, the connector also acts as a code card stop.

After the solenoid planes 13 are glued in place on the solenoid backing plates 12, the preterminated twistor tapes 8 are glued over both solenoid plane halves. The tapes are located with respect to the solenoid backing plates, thus establishing bit locations. The twistor service loops 19 and 20 are established by the spacing between the solenoid backing plates that the tapes span.

Figure 13:
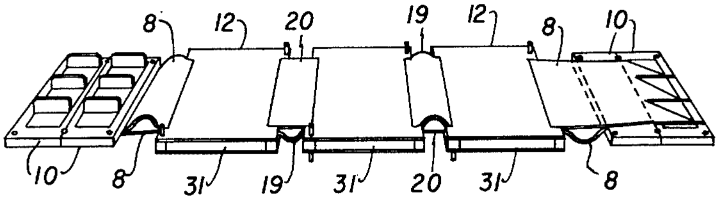
Figure 14:
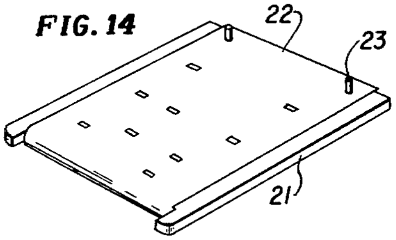
Figure 15:
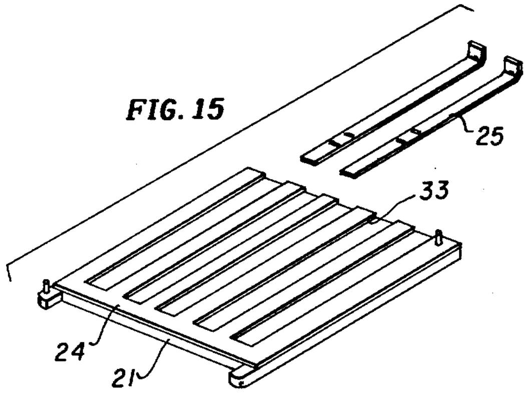

When the tapes are glued in place, the spacer bars 16 with interlock pins 17 are put in place. The coding technique used in the memory determines what part of the memory has the interlock pins. Where a whole solenoid plane is coded at once FIG. 14, the interlock pins are put in spacer bars that act as guides for the code card. For half word code cards FIG. 15, the interlock pins are put in the code card. In each case, when the solenoid planes are closed in assembling the stack, interlock pins protrude in every solenoid plane at two corners on a diagonal across the solenoid backing plate. On the other diagonal there are holes in the backing plates and spacers to receive interlock pins. After construction proceeds to the point shown in FIG. 12 the two sides of the solenoids are folded on one another as shown in FIG. 13. The next step is to stack the solenoid planes one on top of the other as shown in FIG. 16.

Figures 16, 17:
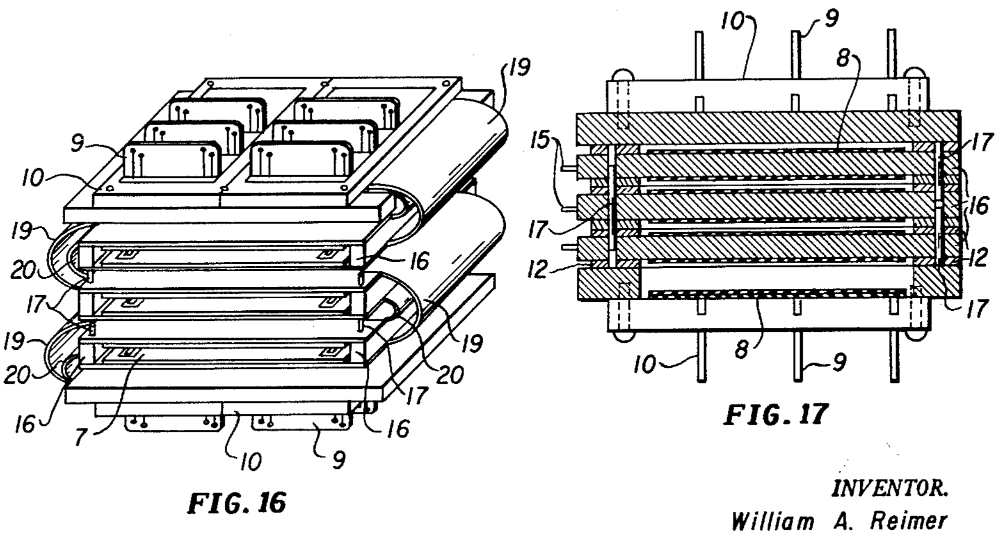

As the solenoid planes are stacked one on top of the other during the third stage of assembly, FIGURE 16, the interlock pins in any given solenoid plane extend into the holes in the planes above and below it as shown in FIGURE 17. Thus, as the memory is assembled the planes are accurately located and lock to one another.

Figure 18:
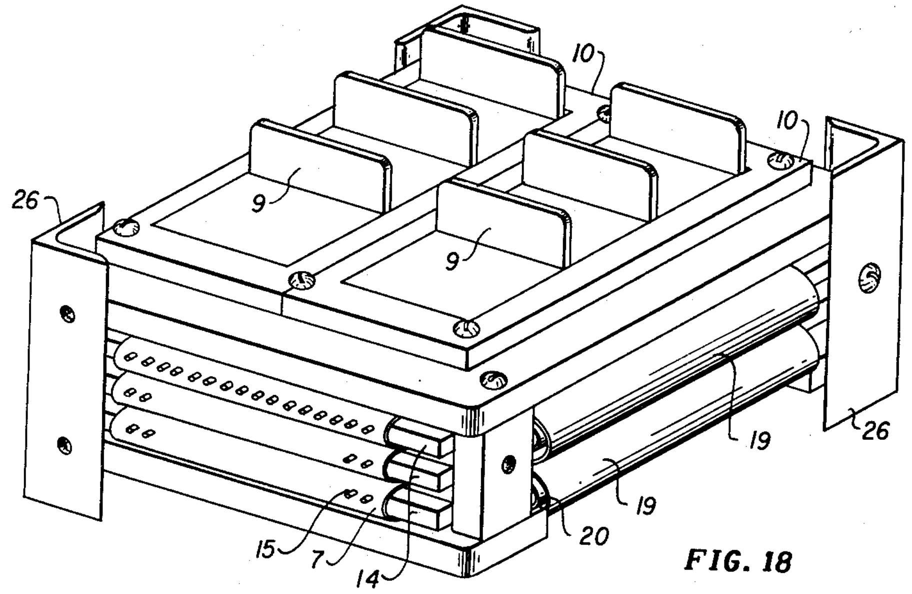

The memory package is locked in place by four side supports 26 shown in FIG. 18 that index to the solenoid backing plates, and by top and bottom plates 32 that mount to the side supports 26. The potting dams 10 are mounted either to the side supports, or to the top and/or bottom plates. The side supports locate the solenoid plane connectors, provide a means for mounting the memory, and protect the twistor tape connectors.

The basic coding operation is accomplished by inserting a punched copper strip 25 in the memory such that the tape-encapsulated twistor 8 is between it and the solenoid 13. As noted above, coding can be accomplished in two ways. Full solenoid plane coding utilizes a punched copper sheet 22 FIG. 14 that wraps around an inserted spacing plate 21. The copper sheet has all the coding for all bit locations in a given solenoid plane. The coding is changed by removing the spacing plate from the memory and either adding punched openings to the copper sheet or putting a different copper sheet with the new coding on the spacing plate. In the case of half word coding, the spacing plate is an integral part of the assembled memory. Punched copper strips insert into the memory and index to guides 33 on the spacing plate. Each strip provides the coding for all the bit locations under one half of one of the solenoids on a solenoid plane.

The basic package as described can be built up in many different ways as dictated by the memory size and optimum packaging density. For large memories, two or more standard solenoid planes can be glued side by side on common solenoid backing plates. Much of the stack hardware is common to all memories where one of the package variables such as word length, backing plate width, etc., is made constant.

Figure 19:
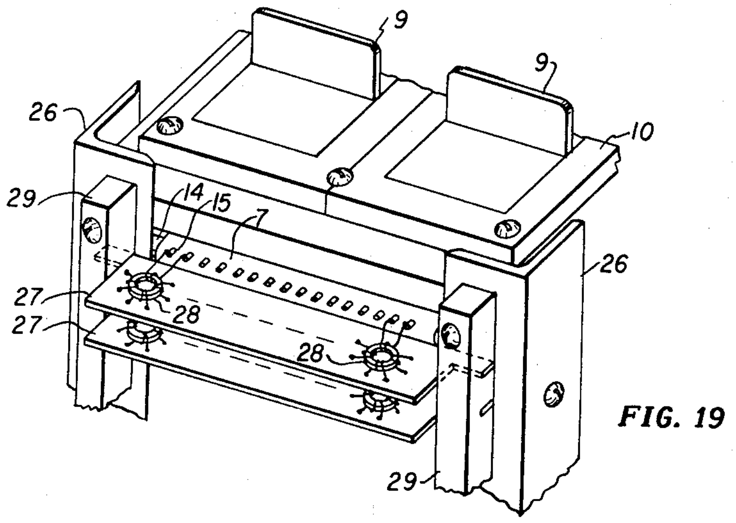

Access to the information is achieved as shown in FIG. 19 by the use of ferrite cores 28 and printed circuit boards 27. By using this method of access a minimum number of connections need be made to the memory.

What is claimed is:

1. A package method for producing a multi-plane semi-permanent twistor memory system comprising the components; at least one pair of substantially rectangularly-shaped solenoids cards arranged in parallel planes and each having multi-turn printed wiring and associated termination pads disposed on at least one surface thereof, at least one strip of twistor tape having a plurality of twistor wires encapsulated in a flat and flexible material and each having two ends, said strip being folded in a substantially corrugated pattern so as to lie adjacent to each parallel solenoid card and over the external surfaces of the top and bottom solenoid card of the package, a plurality of virtual solenoids each comprising a conducting sheet and serving as coding plates to the system, said virtual solenoids being placed intermediate said planes, and connector means fastened to said twistor wire ends for connecting the package to an external circuit, said means lying adjacent the outer surfaces of the outermost solenoid cards, said method comprising the steps of:

(1) placing said substantially rectangularly-shaped solenoid cards side by side on a flat surface with a spacing between each card,
(2) applying said strip of twistor tape over the cards so as to form a two-ply package and so that the main of said printed wiring of said solenoid cards extends in a direction perpendicular to the direction of the twistor wires,
(3) folding said two-ply package in a substantially corrugated pattern so that the folds thereto occur at the spacings between said solenoid cards and a multi-plane package is formed,
(4) inserting said virtual solenoids between the planes formed in step (3),
(5) and soldering said twistor wire ends to said connector means.

2. A package method for producing a multiplane semi-permanent twistor memory system comprising the components; at least one pair of solenoid cards arranged in parallel planes and each having multi-turn printed wiring and associated termination pads disposed on at least one surface thereof, at least one strip of twistor tape having a plurality of twistor wires encapsulated in a flat and flexible material and each having two ends, said strip being folded in a substantially corrugated pattern so as to lie adjacent to each parallel solenoid card and over the external surfaces of the top and bottom of the package, a plurality of virtual solenoids each comprising a conducting sheet and serving as coding plates to the system, said solenoids being placed intermediate said planes, and a pair of potting dam assemblies serving as the means for connecting the package to an external circuit, said assemblies being connected to the two ends of said twistor tape and lying adjacent the outer surfaces of the outermost solenoid cards, each assembly including at least one twistor wire termination board, a potting dam frame, and an encapsulant, said method comprising the steps of:

(1) placing said solenoid cards side by side on a flat surface with a space between each card,
(2) applying said strip of twistor tape over the cards so as to form a two-ply package and so that the main of said printed wiring of said solenoid cards extends in a direction perpendicular to the direction of said twistor wires,
(3) folding said two-ply package in a substantially corrugated pattern so that the folds thereto occur at the spacings between said solenoid cards and a multi-plane package is formed,
(4) inserting said virtual solenoids between the planes formed in step (3),
(5) connecting said twistor wire ends to corresponding ones of said termination boards,
(6) mounting said termination boards to said potting dam frame,
(7) and filling said frame with said encapsulant thereby encapsulating at least a portion of said termination boards.

3. A package method for producing a multiplane semi-permanent twistor memory system comprising the components; at least one pair of solenoid cards arranged in parallel planes and each having multi-turn printed wiring and associated termination pads disposed on at least one surface thereof, at least one pair of electrical connectors soldered to said solenoid cards at said termination pads, at least one strip of twistor tape having a plurality of twistor wires encapsulated in a flat and flexible material and each having two ends, said strip being folded in a substantially corrugated pattern so as to lie adjacent to each parallel solenoid card and over the external surfaces of the top and bottom solenoid card of the package, a plurality of spacer bars positioned between the successive parallel planes, a plurality of virtual solenoids each comprising a conducting sheet and serving as coding plates to the system, said solenoids being placed intermediate said planes and between said spacer bars, a pair of potting dam assemblies connected to the ends of said twistor tape and each including at least one twistor wire termination board, a potting dam frame, and an encapsulant, and a mounting frame structure substantially encompassing the package, said method comprising the steps of:

(1) placing said solenoid cards side by side on a flat surface with a spacing between each card,
(2) applying said strip of twistor tape over the cards so as to form a two-ply package and so that the main of said printed wiring of said solenoid cards extends in a direction perpendicular to the direction of said twistor wires,
(3) assembling said spacer bars over the strip of twistor tape and to said solenoid cards,
(4) mounting and soldering said electrical connectors to said solenoid termination pads,
(5) folding said two-ply package in a substantially corrugated pattern so that the folds thereto occur at the spacings between said solenoid cards and a multi-plane package is formed,
(6) inserting said virtual solenoids in the spacing defined by the parallel planes formed in step (5) and said spacer bars and said electrical connectors,
(7) connecting and soldering said twistor wire ends to corresponding ones of said termination boards,
(8) assembling said termination boards to said potting dam frame,
(9) filling said potting dam frame with an encapsulant thereby securing said components of the potting dam assembly,

(10) and assembling said frame structure to the package formed in steps (1 through 9).

4. A packaging method for producing a multiplane semi-permanent twistor memory system comprising the components; a plurality of substantially rectangularly-shaped solenoid backing plates arranged in parallel planes, a plurality of solenoid cards each having multi-turn printed wiring and associated termination pads disposed on at least one surface thereof and being folded so that the ends of each card be in two parallel planes adjacent to said backing plates, a corresponding number of solenoid electrical connectors soldered to said solenoid cards at said termination pads, at least two strips of twistor tape each including a plurality of twistor wires encapsulated in a flat and flexible material and each having two ends, said strips being folded in a substantially corrugated pattern so as to lie adjacent to each parallel solenoid card and over the external surfaces of the top and bottom backing plate of the package, a plurality of spacer bars positioned between the successive parallel planes and having pins which extend therefrom and interlock with corresponding pins of adjacent spacer bars thereby holding said components in a fixed position after they are folded, a plurality of virtual solenoids each comprising a conducting sheet and serving as coding plates to the system, said virtual solenoids being placed intermediate said planes and between said spacer bars, and a pair of potting dam assemblies connected to the ends of said twistor tape and each including at least one twistor wire termination board, a potting dam frame, and an encapsulant, said method comprising the steps of:

(1) forming two rows of said substantially rectangularly shaped solenoid backing plates on a flat surface with a spacing between each plate, (2) placing said solenoid cards over said backing plates so that each card extends over two of said backing plates, one in each row, and so that there is a spacing between adjacent ones of said solenoid cards, (3) applying said two strips of twistor tape over said solenoid cards in a manner such that there is a space between the two strips and that the longitudinal axis of the strips are normal to the same axis of said solenoid cards and such that the main of said printed wiring of said solenoid cards extends in a direction perpendicular to the direction of said twistor wires, (4) assembling said spacer bars over and perpendicular to the edges of at least one strip of said twistor tape and securing same to said backing plates, (5) mounting and soldering said solenoid electrical connectors to said solenoid termination pads such that they lie in said spacing between said strips and perpendicular to said spacer bars, (6) folding said solenoid cards such that the ends thereof extend in parallel planes and said two strips of twistor tape applied thereto lie one above the other thereby forming a two plane package, said folds occurring at the location of said electrical connectors so that they remain accessible to external circuitry, (7) folding said two plane package formed in step (6) in a substantially corrugated pattern so that the folds thereto occur at the spacings between adjacent ones of said solenoid cards and a multi-plane package is formed, (8) interlocking said spacer bar pins to retain the folded structure in planes, (9) inserting said virtual solenoids in the respective areas defined by the parallel planes formed in step (7) and said spacer bars and said solenoid electrical connectors,

(10) and soldering said twistor wire ends to corresponding ones of said potting dam assemblies.

5. A package method as claimed in claim 4 wherein step 10 includes the steps of: connecting and soldering said twistor wire ends to corresponding ones of said termination boards; assembling said termination boards to said potting dam frame; and filling said frame with said encapsulant thereby securing said components of the potting dam assemblies.

6. A package method for producing a mutli-plane semi-permanent twistor memory system comprising the components; a plurality of substantially rectangularly-shaped solenoid backing plates arranged in parallel planes, a plurality of solenoid cards each having multi-turn printed wiring and associated termination pads disposed on at least one surface thereof and being folded so that the ends of each card lie in two parallel planes adjacent to said backing plate, a corresponding number of solenoid electrical connectors soldered to said solenoid cards, at least two strips of twistor tape each including a plurality of twistor wires encapsulated in a flat and flexible material and each having two ends said strips being folded in a substantially corrugated pattern so as to lie adjacent to each parallel solenoid card and over the external surfaces of the top and bottom backing plate of the package, a plurality of spacer bars positioned between the successive parallel planes and having pins which extend therefrom and interlock with corresponding pins of adjacent spacer bars thereby holding said components in a fixed position after they are folded, a plurality of virtual solenoids each comprising a conducting sheet and serving as coding plates to the system, said virtual solenoids being placed intermediate said planes and between said spacer bars, a pair of potting dam assemblies serving as the means for connecting the package to an external circuit, said assemblies being connected to the ends of said twistor tape and lying adjacent the outer surfaces of the outermost solenoid cards, each assembly including at least one twistor wire termination board, a potting dam frame, and an encapsulant, a mounting frame structure substantially surrounding the package, and a magnetic storage unit having at least one ring core connected to the electrical connectors mounted to said solenoid termination pads, said method comprising the steps of:

(1) forming two rows of said solenoid backing plates on a flat surface with a spacing between each plate, (2) placing said solenoid cards over said backing plates so that each card extends over two backing plates, one in each row, and so that there is a spacing between adjacent ones of said solenoid cards, (3) applying said strips of twistor tape over said solenoid cards in a manner such that there is a space between the two strips and that the longitudinal axis of the strips are normal to the same axis of the solenoid cards and such that the main of said printed wiring of said solenoid cards extends in a direction perpendicular to the direction of said twistor wires, (4) assembling said spacer bars over and perpendicular to the edges of at least one strip of said twistor tape and securing same to said backing plates, (5) mounting and soldering said solenoid electrical connectors to said solenoid termination pads such that they lie in the spacing between said strips and perpendicular to said spacer bars, (6) folding said solenoid cards such that the ends of said cards extend in parallel planes and the two strips of twistor tape applied thereto lie one above the other thereby forming a two plane package, said folds occurring at the location of said electrical connectors so that they remain accessible to external circuitry, (7) folding said two plane package formed in step (6) in a substantially corrugated pattern so that the folds thereto occur at the spacings between adjacent ones of said solenoid cards and a multi-plane package is formed, (8) interlocking said pins extending from each of said spacer bars to retain the folded structure in planes, (9) inserting said virtual solenoids in the respective areas defined by the parallel planes formed in step (7), said spacer bars and said electrical connectors,

(10) soldering said two ends of said twistor wires to corresponding ones of said termination boards,

(11) assembling said termination boards to corresponding ones of said potting dam frames,

(12) filling said potting dam frames with an encapsulant thereby fixing the components of said potting dam assemblies,

(13) mounting said frame structure to the package formed in steps 1–12,

(14) mounting said magnetic storage unit to said frame structure, and

(15) connecting said electrical connectors to said ring cores.

References Cited in the file of this patent

UNITED STATES PATENTS

| | | |
|---|---|---|
| 2,978,683 | Alexander | Apr. 4, 1961 |
| 3,069,665 | Bobeck | Dec. 18, 1962 |

OTHER REFERENCES

Computer Memories, A Survey of the State-of-the-Art (Rajchman), pp. 117–118, Proceedings of the IRE, January 1961.

A Permanent Magnet Twistor Memory Element of Improved Characteristics (Alexander et al.) pp. 1075–1076 Journal of Applied Physics, March 1962.